United States Patent
Kramer et al.

(10) Patent No.: US 9,359,507 B2
(45) Date of Patent: Jun. 7, 2016

(54) AMBIENT CURABLE CORROSION RESISTANT SOL-GEL COATING AND COMPOSITION AND PROCESS FOR MAKING THE SAME

(71) Applicant: Henkel AG & Co. KGaA, Duesseldorf (DE)

(72) Inventors: Kirk Kramer, West Bloomfield, MI (US); Lisa Salet, Sterling Heights, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 298 days.

(21) Appl. No.: 13/832,833

(22) Filed: Mar. 15, 2013

(65) Prior Publication Data

US 2014/0272155 A1  Sep. 18, 2014

(51) Int. Cl.
*C09D 5/08* (2006.01)
*C23C 18/12* (2006.01)
*C23C 22/83* (2006.01)

(52) U.S. Cl.
CPC ........ *C09D 5/08* (2013.01); *C09D 5/086* (2013.01); *C23C 18/122* (2013.01); *C23C 18/1216* (2013.01); *C23C 18/1241* (2013.01); *C23C 18/1245* (2013.01); *C23C 18/1254* (2013.01); *C23C 22/83* (2013.01); *C23C 2222/20* (2013.01)

(58) Field of Classification Search
CPC ........ C08K 5/544; C08K 5/5435; C09D 5/08; C23C 18/1241
See application file for complete search history.

(56) References Cited

U.S. PATENT DOCUMENTS

| | | | |
|---|---|---|---|
| 5,028,489 A | 7/1991 | Kissel | |
| 5,206,285 A * | 4/1993 | Castellucci | 524/588 |
| 5,789,085 A | 8/1998 | Blohowiak et al. | |
| 5,814,137 A | 9/1998 | Blohowiak et al. | |
| 5,849,110 A | 12/1998 | Blohowiak et al. | |
| 5,866,652 A | 2/1999 | Hager et al. | |
| 5,869,140 A | 2/1999 | Blohowiak et al. | |
| 5,869,141 A | 2/1999 | Blohowiak et al. | |
| 5,939,197 A | 8/1999 | Blohowiak et al. | |
| 5,958,578 A | 9/1999 | Blohowiak et al. | |
| 6,037,060 A | 3/2000 | Blohowiak et al. | |
| 6,077,885 A | 6/2000 | Hager et al. | |
| 6,605,365 B1 | 8/2003 | Krienke et al. | |
| 6,770,371 B2 | 8/2004 | Stephenson et al. | |
| 7,001,666 B2 | 2/2006 | Krienke et al. | |
| 8,147,918 B2 | 4/2012 | Standke et al. | |
| 2003/0024432 A1 | 2/2003 | Chung et al. | |
| 2009/0148711 A1 | 6/2009 | Le Blanc et al. | |
| 2009/0192251 A1 | 7/2009 | Chung et al. | |
| 2010/0273013 A1* | 10/2010 | Jin et al. | 428/447 |
| 2012/0101181 A1 | 4/2012 | Munshi et al. | |
| 2013/0035413 A1 | 2/2013 | Obi et al. | |
| 2013/0095317 A1* | 4/2013 | Kramer et al. | 428/336 |

FOREIGN PATENT DOCUMENTS

| | | |
|---|---|---|
| CN | 101007901 A | 8/2007 |
| CN | 101184866 A | 5/2008 |
| WO | 0074451 A1 | 12/2000 |
| WO | 2006137663 A1 | 12/2006 |
| WO | 2010121872 A1 | 10/2010 |
| WO | 2011 156438 | * 12/2011 |
| WO | 2011156438 A1 | 12/2011 |

OTHER PUBLICATIONS

Chinese Office Action Dated May 6, 2014, Application No. 201180033850.6, 10 Pages.
PCT International Search Report Dated Oct. 14, 2011, Application No. PCT/US2011/039539, Applicant Henkel AG & Co. KGAA, 3 Pages.
Written Opinion for PCT/IB2014/001103, dated Nov. 19, 2014, 8 pages.
International Search Report for PCT/IB2014/001103, dated Nov. 19, 2014, 4 pages.
Sandra K. Young, "Overview of Sol-Gel Science and Technology," Army Research Laboratory, Jan. 2002, (24 pages total).
US 8,772,432, 07/2014, Albert et al. (withdrawn)

* cited by examiner

*Primary Examiner* — Kuo-Liang Peng
(74) *Attorney, Agent, or Firm* — Mary K. Cameron

(57) ABSTRACT

A coating composition and a method for coating metallic substrates for corrosion resistance. In at least one embodiment, the coating composition comprises acid, metal acetate, epoxy silane, aminosilane and water.

24 Claims, No Drawings

AMBIENT CURABLE CORROSION RESISTANT SOL-GEL COATING AND COMPOSITION AND PROCESS FOR MAKING THE SAME

BACKGROUND OF THE INVENTION

1. Field of the Invention

In at least one embodiment, the present invention relates to an ambient cured or bake cured sol-gel surface coating that imparts corrosion resistance. In other embodiments, the present invention relates to an ambient curable or bake curable sol-gel coating composition and process for making and using the sol-gel coating composition.

2. Background Art

Sol-gel coatings have been used as conversion coatings for aluminum and other metal substrates such as ferrous and zinc substrates. One particular use of sol-gel coatings has been in the aerospace industry. For instance, sol-gel coatings have been applied to substrates particular to that industry, such as aluminum and titanium alloys, as an adhesion promoter between the underlying substrate and a paint primer, such as an epoxy primer. In addition to being an adhesion promoter, sol-gel coatings can provide good corrosion resistance, particularly on aluminum substrates, when the coating is baked.

Typical sol-gel bake systems are 100° Celsius to 250° Celsius. However, when the sol-gel coating is used on aircrafts, typical sol-gel coatings are not particularly suitable since it is not considered advantageous to expose aircraft substrates to temperatures necessary to achieve baking. The same sol-gel coatings that have good corrosion resistance at the high bake temperatures tend not to perform well when cured in ambient conditions, such as at room temperature, which is the preferred temperature for curing a composition used on the exterior of an aircraft.

Accordingly, it would be advantageous to provide a sol-gel coating that can have favorable corrosion resistance when cured at temperatures less than 100° Celsius and, preferably around room temperature. Moreover, it would also be desirable if such a coating had good corrosion resistance performance at elevated cured temperatures.

SUMMARY OF THE INVENTION

It has been found that certain aqueous sol-gel compositions containing acid, metal acetate, epoxy silane and aminosilane provide sol-gel coatings that can have favorable corrosion resistance when cured at temperatures less than 100° Celsius, such as room temperature.

In at least one embodiment, the present invention comprises a sol-gel composition comprising acid, metal acetate, epoxy silane, aminosilane, water and optionally a surfactant. In this embodiment, the sol-gel composition comprises 1.75-8.0 weight percent acid, 1.5-8.0 weight percent metal acetate, 8-40 weight percent epoxy silane, 2 to 10 weight percent aminosilane, 35-90 weight percent water, and 0-1 weight percent surfactant. In another embodiment, the sol-gel composition comprises 2-4.0 weight percent acid, 1.75-4.0 weight percent metal acetate, 8-20 weight percent epoxy silane, 2-5 weight percent aminosilane, 65-88 weight percent water, and 0-0.25 weight percent surfactant. Unless stated to the contrary, these and other weight percents are based on actives.

In a preferred embodiment, the present invention comprises a sol-gel composition comprising glacial acetic acid, metal acetate, glycidoxypropyl trimethoxy silane, N-2-aminoethyl-3-aminopropyltrimethoxysilane, water and optionally a surfactant. In this embodiment, the metal acetate can be either zirconium acetate, magnesium acetate, or a combination thereof. In this embodiment, the sol-gel composition comprises 1.75-8.0 weight percent glacial acetic acid, 1.5-8.0 weight percent metal acetate, 8-40 weight percent of an epoxy silane, such as glycidoxypropyl trimethoxy silane, 2-10 weight percent of an aminosilane, such as aminopropyltrimethoxysilane, 35-90 weight percent water, and 0-1 weight percent surfactant. In another embodiment, the sol-gel composition comprises 2-4.0 weight percent glacial acetic acid, 1.75-4.0 weight percent metal acetate, 8-20 weight percent of an epoxy silane, 2-5 weight percent aminosilane, 65-88 weight percent water, and 0-0.25 weight percent surfactant.

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Acid | 1.75 to 8.0 |
| Metal Acetate (solids) | 1.5 to 8.0 |
| Epoxy silane | 8.0 to 40.0 |
| Aminosilane | 2.0 to 10 |
| Water | 35.0 to 90.0 |
| Surfactant | 0 to 1.0 |

In accordance with various other embodiments of the invention is an aqueous composition for coating metal substrates, wherein the aqueous composition comprises, preferably consists essentially of, and more preferably consists of:

| Component | Weight Percent |
| --- | --- |
| Acid | 2.0 to 4.0 |
| Metal Acetate (solids) | 1.75 to 4.0 |
| Epoxy silane | 8.0 to 20.0 |
| Aminosilane | 2.0 to 5.0 |
| Water | 65.0 to 88.0 |
| Surfactant | 0 to 0.25 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Glacial Acetic Acid | 1.75 to 8.0 |
| Zirconium Acetate (solids) | 1.5 to 8.0 |
| Glycidoxypropyl Trimethoxy Silane | 8.0 to 40.0 |
| Aminopropyltrimethoxysilane | 2.0 to 10.0 |
| Water | 35.0 to 90.0 |
| Surfactant | 0 to 1.0 |

In accordance with various other embodiments of the invention is an aqueous composition for coating metal substrates, wherein the aqueous composition comprises, preferably consists essentially of, and more preferably consists of:

| Component | Weight Percent |
| --- | --- |
| Glacial Acetic Acid | 2.0 to 4.0 |
| Zirconium Acetate (solids) | 1.75 to 4.0 |

-continued

| Component | Weight Percent |
| --- | --- |
| Glycidoxypropyl Trimethoxy Silane | 8.0 to 20.0 |
| Aminopropyltrimethoxysilane | 2.0 to 5.0 |
| Water | 65.0 to 88.0 |
| Surfactant | 0 to 0.25 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Glacial Acetic Acid | 1.75 to 8.0 |
| Magnesium Acetate (solids) | 1.5 to 8.0 |
| Glycidoxypropyl Trimethoxy Silane | 8.0 to 40.0 |
| Aminopropyltrimethoxysilane | 2.0 to 10.0 |
| Water | 35.0 to 90.0 |
| Surfactant | 0 to 1.0 |

In accordance with various other embodiments of the invention is an aqueous composition for coating metal substrates, wherein the aqueous composition comprises, preferably consists essentially of, and more preferably consists of:

| Component | Weight Percent |
| --- | --- |
| Glacial Acetic Acid | 2.0 to 4.0 |
| Magnesium Acetate (solids) | 1.75 to 4.0 |
| Glycidoxypropyl Trimethoxy Silane | 8.0 to 20.0 |
| Aminopropyltrimethoxysilane | 2.0 to 5.0 |
| Water | 65.0 to 88.0 |
| Surfactant | 0 to 0.25 |

In accordance with another embodiment, the coating composition may optionally provide a solvent, particularly to aid in flowability and wettability. In this embodiment, the aqueous composition comprises, preferably consists essentially of, and more preferably consists of:

| Component | Weight Percent |
| --- | --- |
| Acid | 1.5 to 8.0 |
| Metal Acetate (solids) | 1.5 to 8.0 |
| Epoxy silane | 8.0 to 40.0 |
| Aminosilane | 2.0 to 10.0 |
| Water | 35.0 to 88.0 |
| Surfactant | 0 to 0.25 |
| Solvent | 3.0 to 25.0 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Acid | 2.0 to 4.0 |
| Metal Acetate (solids) | 1.75 to 4.0 |
| Epoxy silane | 8.0 to 20.0 |
| Aminosilane | 2.0 to 5.0 |
| Water | 55.0 to 88.0 |
| Surfactant | 0 to 1.0 |
| Solvent | 6.0 to 12.0 |

The coating compositions can be applied onto any suitable surface, such metals and composites, in any suitable manner. In at least one embodiment, the coated composition is spray applied over aluminum substrates. Generally, the coating composition is prepared by combining the water with the acid, the metal acetate, the solvent, and optionally with a surfactant and then within 15 to 60 minutes of use, the silanes are added to allow for the hydrolysis of the silanes to begin. The coating compositions are allowed to air dry at room temperature. Any suitable coating thickness can be employed, however it has been found that coating thicknesses of 0.6 to 2.5 microns have worked particularly well.

Various embodiments of the present invention include working compositions for direct use in coating metals, as well as concentrates, from which such working compositions can be prepared by dilution with water and/or mixing with other chemically distinct concentrates. Various embodiments of the present invention also include processes for treating metals with a composition according to the invention, and may include additional steps that are conventional per se, such as rinsing, conversion coating, and/or painting or some similar overcoating process that puts into place an organic binder containing protective coating over the metal surface treated according to a narrower embodiment of the invention. Articles of manufacture including surfaces treated according to a process of the invention are also within the scope of the invention.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. However, it is to be understood that the disclosed embodiments are merely exemplary of the invention that may be embodied in various and alternative forms. Therefore, specific details disclosed herein are not to be interpreted as limiting, but merely as a representative basis for any later claim and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Except where otherwise expressly indicated, all weight percents herein are to be understood to be based on percent solids. Practice within the numerical limits stated is generally preferred. Also, unless expressly stated to the contrary: percent, "parts of", and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole, and any counterions thus implicitly specified should preferably be selected from among other constituents explicitly specified in ionic form, to the extent possible; otherwise such counterions may be freely selected, except for avoiding counterions that act adversely to the objects of the invention; the term "mole" means "gram mole", "mole" and its variations may be applied herein to ionic or any other chemical species with defined numbers and types of atoms, as well as to chemical substances with well defined conventional molecules; the first definition of an acronym or other abbreviation applies to all subsequent uses herein of the same abbreviation and applies mutatis mutandis to normal grammatical variations of the initially defined abbreviation; and, unless expressly stated to the contrary measurement of a property is determined by the same technique as previously or later referenced for the same property.

In at least one embodiment, the present invention comprises a sol-gel composition comprising acid, metal acetate, epoxy silane, aminosilane, water and optionally a surfactant. In this embodiment, the sol-gel composition comprises 1.75-8.0 weight percent acid, 1.5-8.0 weight percent metal acetate, 8-40 weight percent epoxy silane, 2-10 weight percent aminosilane, 35-90 weight percent water, and 0-1 weight percent surfactant. In another embodiment, the sol-gel composition comprises 2-4.0 weight percent acid, 1.75-4.0 weight percent metal acetate, 8-20 weight percent epoxy silane, 2-5 weight percent aminosilane, 65-88 weight percent water, and 0-0.25 weight percent surfactant.

In at least one embodiment, the pH of the composition is 2.5-5, in other embodiments 3-4, and in yet other embodiments 3.2-3.5.

Any suitable acid can be used. In at least one embodiment, glacial acetic acid is preferred. In other embodiments, fluorozirconic acid, hydrochloric acid, sulfuric acid, nitric acid, phosphoric acid, and combinations thereof could be used either in addition to, or in place of, glacial acetic acid.

Any suitable metal acetate can be used. In at least one embodiment, metal acetates having an oxidation number equal to or greater than 2 have been found to be particularly suitable. In a particularly preferred embodiment, the metal acetate is zirconium acetate or magnesium acetate, however it should be understood that acetates of other metals, such as cobalt, chrome, manganese and lithium, could be used.

In at least one embodiment, the epoxy silane and aminosilane are provided in a weight ratio of 2:1 to 8:1, in another embodiment of 3:1 to 6:1, in yet another embodiment of 3.5:1 to 4.5:1. It is believed that the multi-functional epoxy silanes and aminosilanes, such as epoxy silanes having 1 or more epoxy groups per molecule and aminosilanes having 2 or more amino groups per molecule, provide the best results, however mono-functional silanes will also provide acceptable results. In at least one embodiment trialkoxysilanes are used, and in another embodiment dialkoxysilanes are used. It is believed that the epoxy groups and the amino groups of the epoxy silane and aminosilane will react first with the silanes then condensing to form a film or coating having a relatively tight backbone. This results in a coating that is relatively non-permeable to water, which then results in a relatively corrosion resistant coating.

Any suitable epoxy silane can be used. In at least certain embodiments, epoxy silanes that are hydrolysable at room temperature have been found to be particularly suitable.

While any suitable epoxy silane can be used, examples of certain suitable ones include, but are not limited to, glycidoxymethyltrimethoxysilane, 3-glycidoxypropyltrihydroxysilane, 3-glycidoxypropyl-dimethylhydroxysilane, 3-glycidoxypropyltrimethoxysilane, 3-glycidoxypropyl triethoxysilane, 3-glycidoxypropyldimethoxymethylsilane, 3-glycidoxypropyldimethyl-methoxysilane, 3-glycidoxypropyltributoxysilane, 1,3-bis(glycidoxypropyl)tetramethyldisiloxane, 1,3-bis(glycidoxypropyl)tetramethoxydisiloxane, 1,3-bis(glycidoxypropyl)-1,3-dimethyl-1,3-dimethoxydisiloxane, 2,3-epoxypropyl-trimethoxysilane, 3,4-epoxybutyl-trimethoxysilane, 6,7-epoxyheptyl-trimethoxysilane, 9,10-epoxydecyltrimethoxysilane, 1,3-bis(2,3-epoxypropyl)tetramethoxydisiloxane, 1,3-bis(6,7-epoxyheptyl)tetra-methoxydisiloxane, 2-(3,4-epoxycyclohexyl)ethyltrimethoxysilane, and the like.

Any suitable aminosilane can be used. In at least certain embodiments, aminosilanes that are hydrolysable at room temperature have been found to be particularly suitable. In at least one embodiment, the aminosilane is a multi-functional aminosilane such as silanes having 2 or more amino groups per molecule.

While any suitable aminosilane can be used, examples of suitable aminosilanes include, but are not limited to, the monoamine functional 3-aminopropyltriethoxysilane, and 3-aminopropyl trimethoxysilane, the diamine functional (containing both secondary and tertiary amine functionally) 2-aminoethyl-3-aminopropyltrimethoxysilane (also referred to as "DAMO"), and the secondary amine functional n-butylaminopropyltrimethoxysilane, and n-ethylaminoisobutylrtimethoxysilane.

It should be understood that other conventional sol-gel components, such as solvents, corrosion inhibitors, defoamers, UV-stabilizers, extenders, plasticizers, and pigments as are known in the art, may be included in the composition.

While any suitable solvent can be used, it has been found in at least certain embodiments that ethylene glycol monobutyl ether is a particularly suitable solvent. Other suitable solvents include those that have found particular utility in water borne coating technologies. Examples of other suitable solvents include, but are not limited to, alcohols, such as methanol and ethanol, glycols, such as dipropylene glycol, and other glycol ethers, such as propylene glycol monobutyl ether and dipropylene glycol monobutyl ether.

In one preferred embodiment, the present invention comprises a sol-gel composition comprising glacial acetic acid, metal acetate, glycidoxypropyl trimethoxy silane, 2-aminoethyl-3-aminopropyl trimethoxy silane, water and optionally a surfactant. In this embodiment, the metal acetate is either zirconium acetate, magnesium acetate, or a combination thereof. In this embodiment, the sol-gel composition comprises 1.75-8.0 weight percent glacial acetic acid, 1.5-8.0 weight percent metal acetate, 8-40 weight percent of an epoxy silane, such as glycidoxypropyl trimethoxy silane, 2.0-10 weight percent aminosilane, such as 2-aminoethyl-3-aminopropyl trimethoxy silane, 35-90 weight percent water, and 0-1 weight percent surfactant. In another embodiment, the sol-gel composition comprises 2-4.0 weight percent glacial acetic acid, 1.75-4.0 weight percent metal acetate, 8-20 weight percent of an epoxy silane, 2.0-5 weight percent aminosilane, 65-88 weight percent water, and 0-0.25 weight percent surfactant.

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Acid | 1.75 to 8.0 |
| Metal Acetate (solids) | 1.5 to 8.0 |
| Epoxy silane | 8.0 to 40.0 |
| Aminosilane | 2.0 to 10 |
| Water | 35.0 to 90.0 |
| Surfactant | 0 to 1.0 |

In accordance with various other embodiments of the invention is an aqueous composition for coating metal substrates, wherein the aqueous composition comprises, preferably consists essentially of, and more preferably consists of:

| Component | Weight Percent |
| --- | --- |
| Acid | 2.0 to 4.0 |
| Metal Acetate (solids) | 1.75 to 4.0 |
| Epoxy silane | 8.0 to 20.0 |
| Aminosilane | 2.0 to 5.0 |
| Water | 65.0 to 88.0 |
| Surfactant | 0 to 0.25 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Glacial Acetic Acid | 1.75 to 8.0 |
| Zirconium Acetate (solids) | 1.5 to 8.0 |
| Glycidoxypropyl Trimethoxy Silane | 8.0 to 40.0 |
| N-2-aminoethyl-3-aminopropyltrimethoxysilane | 2.0 to 10 |
| Water | 35.0 to 90.0 |
| Surfactant | 0 to 1.0 |

In accordance with various other embodiments of the invention is an aqueous composition for coating metal substrates, wherein the aqueous composition comprises, preferably consists essentially of, and more preferably consists of:

| Component | Weight Percent |
| --- | --- |
| Glacial Acetic Acid | 2.0 to 4.0 |
| Zirconium Acetate (solids) | 1.75 to 4.0 |
| Glycidoxypropyl Trimethoxy Silane | 8.0 to 20.0 |
| N-2-aminoethyl-3-aminopropyltrimethoxysilane | 2.0 to 5.0 |
| Water | 65.0 to 88.0 |
| Surfactant | 0 to 0.25 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Glacial Acetic Acid | 1.75 to 8.0 |
| Magnesium Acetate (solids) | 1.5 to 8.0 |
| Glycidoxypropyl Trimethoxy Silane | 8.0 to 40.0 |
| N-2-aminoethyl-3-aminopropyltrimethoxysilane | 2.0 to 10.0 |
| Water | 35.0 to 90.0 |
| Surfactant | 0 to 1.0 |

In accordance with various other embodiments of the invention is an aqueous composition for coating metal substrates, wherein the aqueous composition comprises, preferably consists essentially of, and more preferably consists of:

| Component | Weight Percent |
| --- | --- |
| Glacial Acetic Acid | 2.0 to 4.0 |
| Magnesium Acetate (solids) | 1.75 to 4.0 |
| Glycidoxypropyl Trimethoxy Silane | 8.0 to 20.0 |
| N-2-aminoethyl-3-aminopropyltrimethoxysilane | 2.0 to 5.0 |
| Water | 65.0 to 88.0 |
| Surfactant | 0 to 0.25 |

In accordance with another embodiment, the coating composition may optionally provide a solvent, particularly to aid in flowability and wettability. In this embodiment, the aqueous composition comprises, preferably consists essentially of, and more preferably consists of:

| Component | Weight Percent |
| --- | --- |
| Acid | 1.5 to 8.0 |
| Metal Acetate (solids) | 1.5 to 8.0 |
| Epoxy silane | 8.0 to 40.0 |
| Aminosilane | 2.0 to 10.0 |
| Water | 35.0 to 88.0 |
| Surfactant | 0 to 0.25 |
| Solvent | 0 to 40.0 |

In accordance with yet another embodiment, the coating composition may optionally provide a solvent, particularly to aid in flowability and wettability. In this embodiment, the aqueous composition comprises, preferably consists essentially of, and more preferably consists of:

| Component | Weight Percent |
| --- | --- |
| Acid | 2.0 to 4.0 |
| Metal Acetate (solids) | 1.75 to 4.0 |
| Epoxy silane | 8.0 to 20.0 |
| Aminosilane | 2.0 to 5.0 |
| Water | 55.0 to 88.0 |
| Surfactant | 0 to 0.25 |
| Solvent | 5.0 to 15.0 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Glacial Acetic Acid | 2.0 to 4.0 |
| Magnesium Acetate (solids) | 1.75 to 4.0 |
| Glycidoxypropyl Trimethoxy Silane | 8.0 to 20.0 |
| N-2-aminoethyl-3-aminopropyltrimethoxysilane | 2.0 to 5.0 |
| Water | 55.0 to 88.0 |
| Surfactant | 0 to 1.0 |
| Solvent | 6.0 to 12.0 |

The coating compositions can be applied in any suitable manner onto any suitable metal surface in any suitable manner. In at least one embodiment, the coating composition is spray applied over aluminum substrates. In another embodiment, the coating composition is spray applied over a corrosion resistant coating on a metal substrate. In this embodiment, the coating composition has been found to be particularly effective as a seal for metal oxide corrosion resistant coatings on aluminum alloy substrates. In this embodiment, while any suitable metal oxide can be used, metal oxides of Ti, Zr, Si, Al, Ge and B are preferred, with Ti, Zr, Al and Si being somewhat more preferred, and Ti and Zr being most preferred. The use of the coating composition as a seal for oxide (corrosion resistant) coated alloys has been found to be particularly effective at increasing the corrosion resistance of the underlying substrate, particularly substrates of copper containing aluminum alloys, such as AA2024-T3.

The coating composition can be prepared in any suitable manner. In one embodiment, the coating composition can generally be prepared by combining the water with the acid with the metal acetate and optionally with a surfactant and then within 15 to 60 minutes of use, the silanes are added to allow for the reaction of the amino groups with the epoxy groups and the hydrolysis of the silanes to begin. The coating compositions are allowed to air dry at room temperature. Any suitable coating thickness can be employed, however it has been found that coating thicknesses of 0.6 to 2.5 microns have worked particularly well.

In one particular embodiment, the sol-gel composition is provided as a 2 component (2K) product. The first part (Part A) is comprised of most of the formula, including the acid and the metal acetate. The second part (Part B) comprises the silanes and optionally any components which do not negatively effect stability of Part B, e.g., those that do not cause silane hydrolysis. These two parts are kept separate until just before application. Upon mixing, the epoxy reacts with the amino and the silanes begins hydrolysis and the mixture is applied to the substrate. In at least another embodiment, the sol-gel composition is provided as a 3 component (3K) product with the first part (Part A) comprising of most of the formula, including the acid and the metal acetate, the second part (Part B) comprising the ethoxy silane, and the third part (Part C) comprising the aminosilane to keep the silanes separate and to help prevent the epoxy and amino from prematurely reacting.

In one embodiment, the general formula by weight in grams is:

| Part A | DI Water | 70.23 |
| | Glacial Acetic Acid | 2.71 |
| | Surfactant | 0.042 |
| | Zirconium Acetate (various metal acetates can be used here such as Zr or Mg. | 10.43 |
| Part B | Glycidoxypropyl Trimethoxy Silane | 13.20 |
| | N-2-aminoethyl-3-aminopropyltrimethoxysilane | 3.40 |

The following is an exemplary process for making Part A:
1. Add the water to a clean vessel and start agitator
2. Add glacial acetic acid and mix for 5 minutes
3. Add surfactant and mix for 5 minutes
4. Add zirconium acetate and mix for 15 minutes The order of addition is not critical in this product. However, in one embodiment, it is preferred that the acid is added to the water rather than the other way around.

In the case of magnesium acetate, it should be added to water so it will dissolve (it is a solid raw material).

Part B can be added into Part A and mixed. Once the product is mixed, it should be allowed a 30 minute induction time, remixed, and then used.

Below are particularly preferred embodiments of sol-gel formulas normalized to 100 grams total formula weight or metal portion.

| | Weight (g) | Weight % |
|---|---|---|
| Part A | | |
| DI Water | 70.23 | 70.22 |
| Glacial Acetic Acid | 2.71 | 2.71 |
| Surfactant | 0.042 | 0.04 |
| Zirconium Acetate | 10.43 | 10.43 |
| (about 25% solids in water-based solution) | | |
| Part B | | |
| Glycidoxypropyl Trimethoxy Silane | 13.20 | 13.20 |
| N-2-aminoethyl-3-aminopropyltrimethoxysilane | 3.40 | 3.40 |
| Total | 100.012 | 100 |

The practice of the present invention may be further appreciated by consideration of the following, non-limiting, working examples.

EXAMPLES

Example 1

A master batch of the sol-gel part A was made of the following components in the following amount:

| Component | Wt. % |
|---|---|
| DI Water | 84.2 |
| Zirconium Acetate hydroxide solution (25% Solution) | 12.5 |
| Glacial Acetic Acid | 3.25 |
| Surfactant | 0.05 |
| Total - Part A | 100% |

Then samples were made up as follows:

| | Component (grams) | | | |
|---|---|---|---|---|
| sample | Master Batch | GLYMO | DAMO | Total |
| 178A | 41.7 | 8.3 | 0 | 50 |
| 178B | 41.7 | 7.5 | 0.8 | 50 |
| 178C | 41.7 | 7.1 | 1.2 | 50 |
| 178D | 41.7 | 6.2 | 2.1 | 50 |
| 178E | 41.7 | 5.8 | 2.5 | 50 |
| 178F | 41.7 | 5.4 | 2.9 | 50 |
| | GLYMO/DAMO | | | |
| 178G | 41.7 | 8.3 | | 50 |
| 178H | 41.7 | 8.3 | | 50 |

The GLYMO/DAMO component in samples 178G and 178H were provided as 6.6 grams GLYMO and 1.7 grams of DAMO and were premixed a week prior to combining with the master batch. The 178h sample also included 0.8 grams on n-propanol.

Panels were prepared by cleaning AA2024-T3 panels with Turco 6849 (20% concentration, at 130° F., for 10 minutes), and deoxidizing with Deoxalume 2310 (15% concentration, room temp. for 5 minutes). The samples were made approximately 30 minutes prior to use, to keep the 'induction time' equal, and to allow for the reaction of the epoxy and the aminos and the hydrolysis of the silanes to begin. After 30 minutes, the coating was applied with a spray bottle onto the panels and allowed to air dry in ambient conditions (about 73° F.) for 7 days.

The sample were subjected to 168 hours ASTM B117 salt spray and rated on total percentage of corrosion. The samples having both GLYMO and DAMO had good corrosion protection.

| Sample | Panel 1 | Panel 2 |
| --- | --- | --- |
| 178A | 100% corrosion | 100% corrosion |
| 178B | 10 pits | 10 pits |
| 178C | 5 pits | 3 pits |
| 178D | 5 pits | 3 pits |
| 178E | 0 pits | 0 pits |
| 178F | 10 pits | 12 pits |
| 178G | 1 pits | 0 pits |
| 178H | 0 pits | 0 pits |

Sol-gel samples 178A-178H appeared to provide a coating over AA2024-T3 panels. Similar salt spray tests were performed for 336 hours with good results. It is believed that good results would also be found after 1000 hour salt spray tests.

The sol-gel coated panels appeared to provide corrosion protection to at least 500 hours salt spray hours. This is in excess as to what metal oxide does alone without a sol-gel seal.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An aqueous organo sol-gel composition for coating a metallic component, the composition comprising:
   acid;
   metal acetate comprising zirconium acetate, magnesium acetate, or a combination thereof;
   an epoxy silane;
   an aminosilane; and
   water;
wherein the epoxy silane and the aminosilane are provided in a weight ratio of 4:1 to 8:1.

2. The composition of claim 1 further comprising an optional surfactant, wherein the components are present in the following weight percents based on weight percent solids:

| Components | Weight Percent |
| --- | --- |
| acid | 1.75 to 8 |
| metal acetate | 1.5 to 8 |
| epoxy silane | 8 to 40 |
| aminosilane | 2 to 10 |
| water | 35 to 90 |
| surfactant | 0 to 1. |

3. The composition of claim 2, wherein the components are present in the following weight percents based on weight percent solids:

| Components | Weight Percent |
| --- | --- |
| acid | 2 to 4 |
| metal acetate | 1.75 to 4 |
| epoxy silane | 8 to 20 |
| aminosilane | 2 to 5 |
| water | 55 to 80 |
| surfactant | 0 to 1 |
| solvent | 6 to 12. |

4. The composition of claim 1, wherein the acid comprises glacial acetic acid.

5. The composition of claim 1, wherein the epoxy silane comprises glycidoxypropyl trimethoxy silane.

6. The composition of claim 1, wherein the aminosilane comprises N-2-aminoethyl-3-aminopropyltrimethoxysilane.

7. The composition of claim 1, wherein the pH of the composition is between 2.5 and 5.

8. The coating composition of claim 1, wherein the coating composition is sprayable against a metal substrate to form a coating 0.6 to 2.5 microns thick on the substrate.

9. A method for improving corrosion resistance of a metallic substrate, the method comprising:
   providing the aqueous organo sol-gel of claim 1;
   depositing the composition on an aluminum alloy substrate; and
   allowing the composition to dry to form a sol-gel coating on the substrate.

10. The method of claim 9, wherein the substrate comprises aluminum and copper and has a metallic oxide coating thereon, the sol-gel coating being disposed on the metallic oxide coating in a thickness of 0.6 to 2.5 microns to form a seal over the oxide coating, and the step of depositing the composition comprises spraying the composition over the oxide coating.

11. The method of claim 10, wherein the composition comprises:

| Components | Weight Percent |
| --- | --- |
| acid | 2 to 4 |
| metal acetate | 1.75 to 4 |
| epoxy silane | 8 to 20 |
| aminosilane | 2 to 5 |
| water | 65 to 88 |
| surfactant | 0.1 to 0.25. |

12. The method of claim 10, wherein the composition comprises:

| Components | Weight Percent |
| --- | --- |
| acid | 2 to 4 |
| metal acetate | 1.75 to 4 |
| epoxy silane | 8 to 20 |
| aminosilane | 2 to 5 |
| water | 55 to 88 |
| surfactant | 0 to 1 |
| solvent | 6 to 12. |

13. The method of claim 10 wherein the metal oxide coating is selected from the group consisting of zirconium oxide, titanium oxide and combinations thereof.

14. The method of claim 10, wherein the metal oxide coating comprises titanium oxide.

15. The method of claim 9, wherein the substrate has a metallic oxide coating thereon, the sol-gel coating being disposed on the metallic oxide coating in a thickness of 0.6 to 2.5 microns to form a seal over the oxide coating, and the step of depositing the composition comprises spraying the composition over the oxide coating.

16. The composition of claim 1, wherein the aqueous organo sol-gel composition is provided as a two component product to be mixed just before application to a substrate: Part A comprising the acid and the metal acetate; and Part B comprising the epoxy silane, the aminosilane and optionally additional components which do not negatively affect stability of Part B.

17. The composition of claim 1, wherein the aqueous organo sol-gel composition is provided as a three component product to be mixed just before application to a substrate: Part A comprising the acid and the metal acetate; Part B comprising the epoxy silane; and Part C comprising the aminosilane; whereby premature reaction of the epoxysilane and the aminosilane is prevented.

18. The composition of claim 1, wherein a surfactant is present.

19. The composition of claim 1, wherein the metal acetate comprises zirconium acetate.

20. An aqueous organo sol-gel composition for coating a metallic component, the composition comprising:

| Components | Weight Percent |
| --- | --- |
| glacial acetic acid | 1.75 to 8 |
| metal acetate | 1.5 to 8 |
| glycidoxypropyl trimethoxy silane | 8 to 40 |
| N-2-aminoethyl-3-aminopropyltrimethoxysilane | 2 to 10 |
| water | 35 to 90 |
| surfactant | 0 to 1. |

21. The composition of claim 20, wherein the metal acetate comprises zirconium acetate, magnesium acetate, or a combination thereof.

22. The composition of claim 20, wherein the glycidoxypropyl trimethoxy silane and the N-2-aminoethyl-3-aminopropyltrimethoxysilane are provided in a weight ratio of 4:1 to 8:1.

23. An aqueous organo sol-gel composition for coating a metallic component, the composition comprising:
    acid;
    metal acetate;
    an epoxy silane;
    an aminosilane;
    surfactant; and
    water;
wherein the epoxy silane and the aminosilane are provided in a weight ratio of 4:1 to 8:1.

24. The composition of claim 23, wherein the metal acetate comprises zirconium acetate.

* * * * *